US010373647B2

(12) United States Patent
Esashi

(10) Patent No.: US 10,373,647 B2
(45) Date of Patent: Aug. 6, 2019

(54) RECORDING SYSTEM AND METHOD FOR MULTI-TRACK RECORDING

(71) Applicant: Yamaha Corporation, Hamamatsu-shi, Shizuoka-Ken (JP)

(72) Inventor: Masato Esashi, Halstenbek (DE)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 16/120,665

(22) Filed: Sep. 4, 2018

(65) Prior Publication Data

US 2018/0374511 A1 Dec. 27, 2018

Related U.S. Application Data

(63) Continuation of application No. PCT/JP2017/008000, filed on Feb. 28, 2017.

(30) Foreign Application Priority Data

Mar. 4, 2016 (JP) ................. 2016-042255

(51) Int. Cl.
*G11B 27/031* (2006.01)
*G06F 3/16* (2006.01)

(52) U.S. Cl.
CPC .............. *G11B 27/031* (2013.01); *G06F 3/16* (2013.01)

(58) Field of Classification Search
CPC . G06F 17/40; G06F 17/00; G06F 3/16; G06F 16/00; G11B 27/00; G11B 27/02; G11B 27/10; G11B 27/31

(Continued)

(56) References Cited

U.S. PATENT DOCUMENTS

2015/0104043 A1* 4/2015 Takahashi ............... G10H 7/00
381/119
2015/0213840 A1* 7/2015 Innami .................. G11B 27/34
386/243

FOREIGN PATENT DOCUMENTS

JP 2000-276195 A 10/2000
JP 2000-347322 A 12/2000

OTHER PUBLICATIONS

International Search Report (PCT/ISA/210) issued in PCT Application No. PCT/JP2017/008000 dated May 23, 2017 with English translation (two (2) pages).

(Continued)

*Primary Examiner* — Walter F Briney, III
(74) *Attorney, Agent, or Firm* — Crowell & Moring LLP

(57) ABSTRACT

A management device has a plurality of tracks (MTR) corresponding to a plurality of terminal devices, commands the terminal devices to start/stop recording in response to recording start/stop instructions (recording command circuitry), and creates, in each of the tracks, a provisional segment identifying a recording time corresponding to the instructions (provisional segment creation circuitry). Each of the terminal devices records sound data in response to the recording start/stop instructions (recording circuitry) and transfers the recorded sound data to the management device (transfer circuitry). The management device 10 acquires the sound data from the individual terminal devices (acquisition circuitry), and then the management device records the acquired sound data in association with the provisional segments of the corresponding tracks and thereby converts the provisional segments into actual segments (conversion circuitry).

15 Claims, 8 Drawing Sheets

(58) Field of Classification Search
USPC .......................................................... 700/94
See application file for complete search history.

(56) References Cited

OTHER PUBLICATIONS

Japanese-language Written Opinion (PCT/ISA/237) issued in PCT Application No. PCT/JP2017/008000 dated May 23, 2017 (three (3) pages).
"What is sokureko Air", Yamaha Corporation, 2014 URL:http://www.sokureko24.jp/air/ (eight (8) pages).
English Translation of document C3 ("What is sokureko Air" previously filed on Sep. 4, 2018) (eight (8) pages).
International Preliminary Report on Patentability (PCT/IB/338 & PCT/IB/373) issued in PCT Application No. PCT/JP2017/008000 dated Feb. 28, 2017, including English translation of document C2 (Japanese-language Written Opinion (PCT/ISA/237) previously filed on Sep. 4, 2018) (six (6) pages).

* cited by examiner

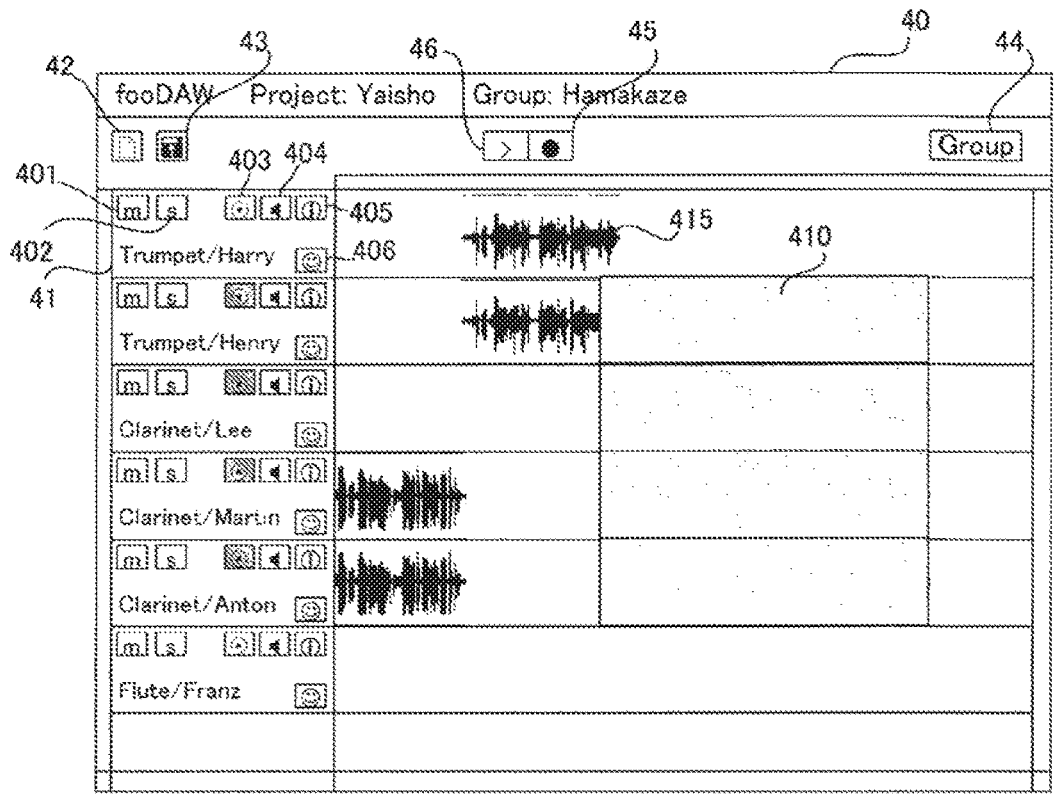
F I G. 4
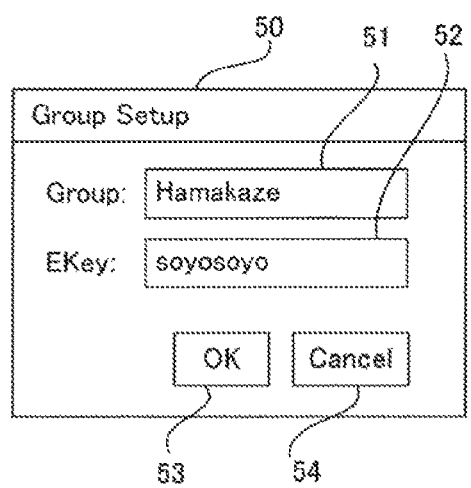
F I G. 5

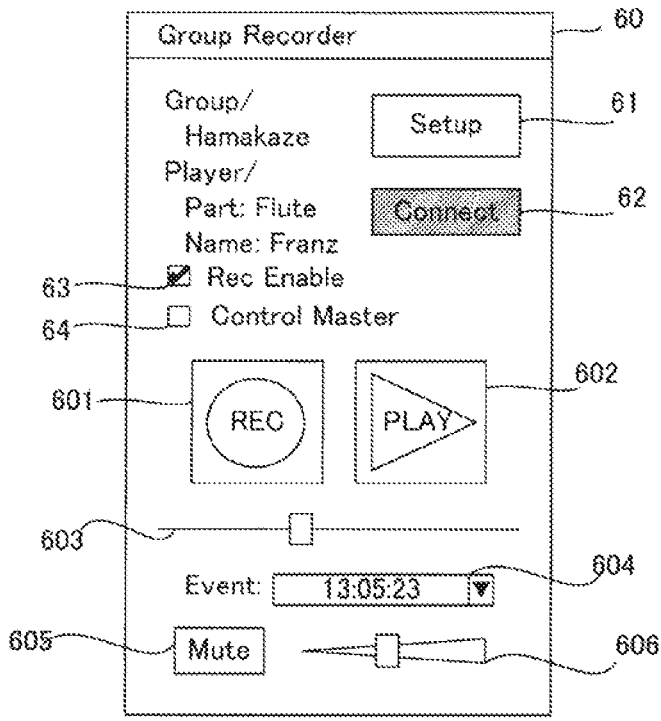
FIG. 6
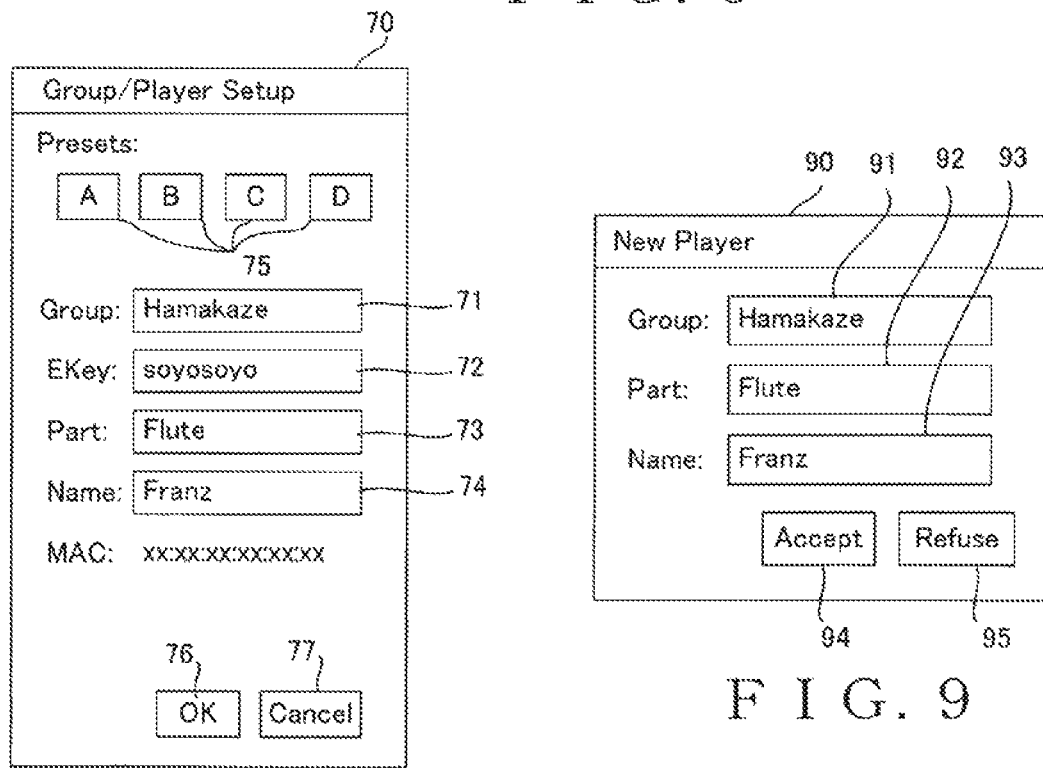
FIG. 7
FIG. 9

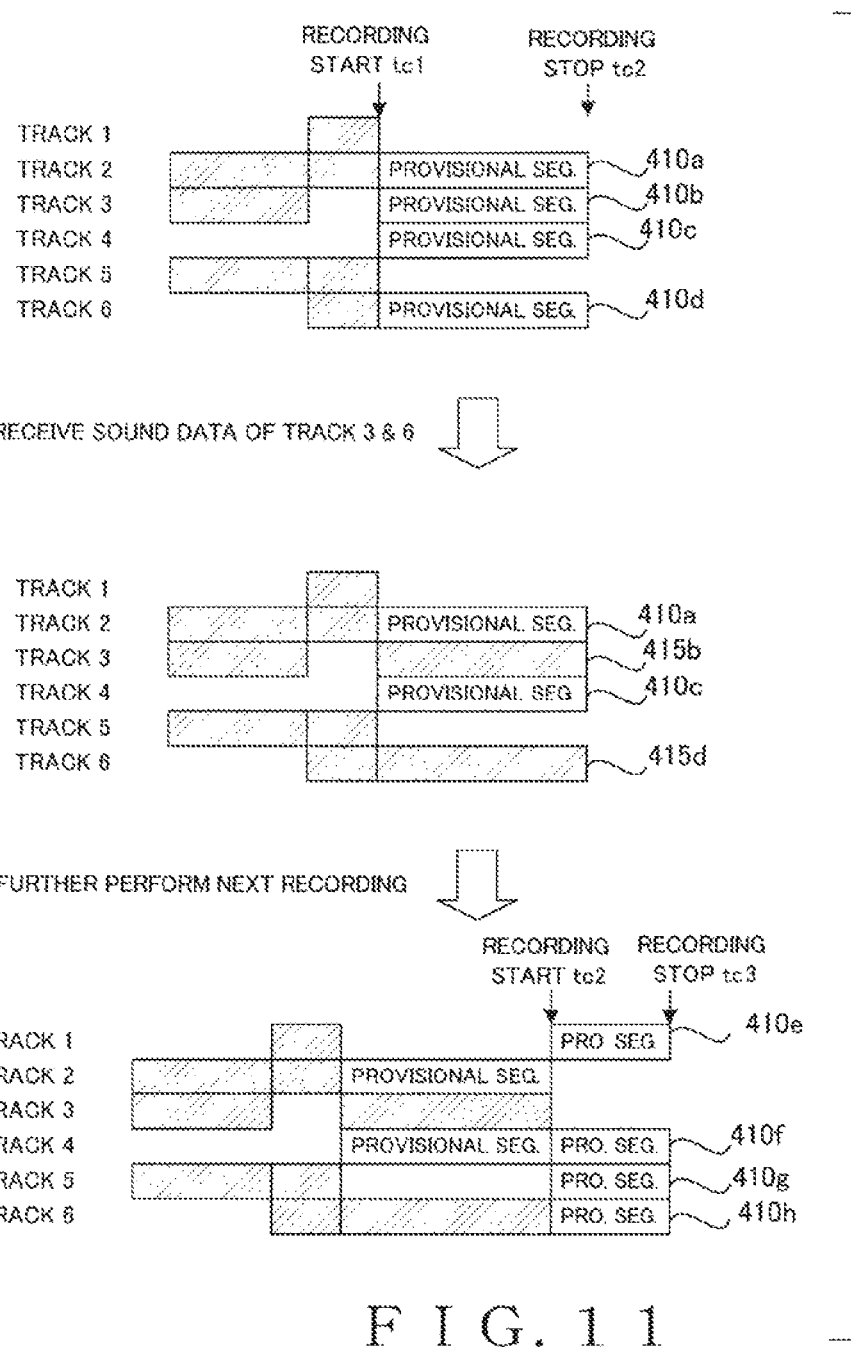
F I G. 11

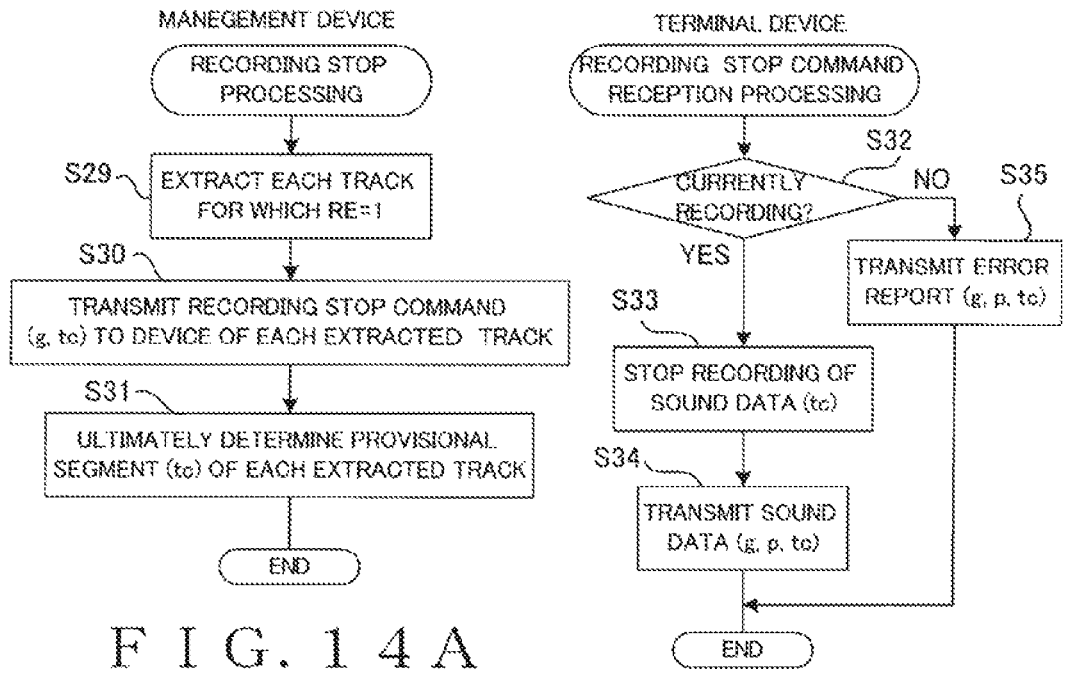
F I G. 14 A
F I G. 14 B
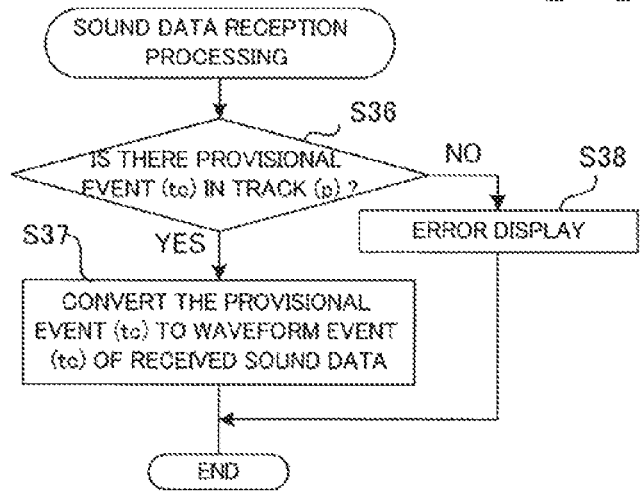
F I G. 15

RECORDING SYSTEM AND METHOD FOR MULTI-TRACK RECORDING

BACKGROUND

The present invention relates to recording systems and methods suited for multi-track-recording sounds of a plurality of performance parts in a performance of a brass band, group singing, etc.

There have heretofore been known recording systems suited, for example, for readily recording a music performance executed by a plurality of persons, such as a performance of a brass band or group singing, one example of which is the recording system disclosed in Non-patent Literature 1 identified below. This recording system includes: a tablet terminal having an application program for the recording system stored therein; an audio interface device connected to the tablet terminal; and a microphone connected to the audio interface device, and in response to a user merely operating buttons displayed on a display of the tablet terminal, the recording system can readily record music performance sounds and reproduce the recorded sound data. Further, the recorded sound data can be uploaded to a cloud server through a one-touch operation, and thus, the uploaded sound source can be test-listened to in a streaming fashion via a desired terminal device, such as a personal computer or smartphone having a test-listening application program stored therein.

Because the aforementioned recording system is compact, it is useful, for example, in practicing and teaching of a group music performance that is to be executed by a brass band, singing group or the like, because sound recording environment can be readily built in any places, such as a music practicing room and gymnastic hall of a school and a community hall and because a recording uploaded to the cloud server can be shared among a plurality of persons. However, with the aforementioned recording system, it is not possible to record sounds of an entire group music performance, such as a performance of a brass band, singing group or the like, into separate tracks corresponding to individual human players or performance parts, i.e., into a separate track for each human player or performance part.

With the conventionally known technique, dedicated equipment, such as a multiplicity of microphones and a multi-track recorder, has to be provided in order to record a performance of a brass band, group singing or the like using a separate track for each human player or performance part, and thus, much time and labor is required for wiring the microphones and making settings for the recorder.

Patent Literature 1 further discloses a recording system where a plurality of digital recorders are interconnected in a wired or wireless manner, which particularly discloses that once any one of the plurality of recorders is caused to start recording, all of the other recorders start recording simultaneously. In this recording system, however, no consideration is made as to how to manage sound data recorded separately on the individual recorders. Thus, in a case where the recording system is applied, for example, to recording of a performance of a brass band, the recording system can record player-specific or performance-part-specific performance sounds separately onto the individual recorders, but it is not easy to obtain, from the recorders, multi-track sound sources having performance sounds of the entire brass band. Namely, it takes much time and labor to integrate the sound data recorded on the individual recorders and thereby obtain performance sounds indicative of performance sounds of the entire brass band.

Further, Patent Literature 2 discloses a camera system where a camera and external equipment, such as a sound data recording device, are communicatively connected with each other, which particularly discloses that an image recording by the camera and a sound recording by the sound data recording device are associated with each other on the basis of time information of the two devices.

Patent Literature 1: Japanese Patent Application Laid-open Publication No. 2000-276195
Patent Literature 2: Japanese Patent Application Laid-open Publication No. 2000-347322
Non-patent Literature 1: "What is sokureko Air?", [online], Yamaha corporation, 2014, [searched on October 21, Heisei 27], Internet <URL:http://www.sokureko24.jp/air/>

SUMMARY OF INVENTION

In view of the foregoing prior art problems, it is an object of the present invention to provide a recording system and method which can readily perform, without taking much time and labor, multi-track recording of performance sounds in an entire group music performance, such as a performance of a brass band or group singing, using a separate track for each human player or for each performance part.

In order to accomplish the above-mentioned object, a recording system according to the present invention a recording system, which includes: a plurality of first devices each having a function for recording independently of the other of the first devices; and a second device having a plurality of tracks associated with the plurality of first devices. The second device includes: provisional segment creation circuitry that, in response to a simultaneous recording command to the plurality of first devices, creates in each of the plurality of tracks a provisional segment identifying a time of the simultaneous recording; acquisition circuitry that acquires from the plurality of first devices sound data simultaneously recorded in individual ones of the plurality of first devices in response to the simultaneous recording command; and conversion circuitry that records the sound data, acquired from the individual first devices, into the provisional segments created in corresponding ones of the tracks and thereby converts the provisional segments into actual segments having the sound data actually recorded therein.

According to the present invention, the terminal devices are associated in advance with the individual tracks of the second device. In response to a simultaneous recording command, each of the first devices starts recording. Also, in response to the simultaneous recording command, the second device creates in each of the plurality of tracks a provisional segment, identifying a time of the simultaneous recording, in such a manner that sound data recorded in each of the first devices is recorded into the provisional segment created in the corresponding track. Because no sound data is not recorded in the provisional segments prior to the recording instruction, it is possible to easily and quickly create the provisional segments with a same recording time axis shared between the individual first devices. Further, because the provisional segments are converted to actual segments by the sound data acquired from the individual terminal devices being recorded into the corresponding provisional segments, the sound data can be recorded into each of the tracks with the same time axis shared with the other track (or tracks). As a result, a user can execute multi-track recording by only giving the simultaneous recording command.

The present invention may be practiced not only as the device invention discussed above but also as a method invention including steps of implementing the functions of the recording system. Also, the present invention may be practiced as a program for causing a computer to implement the functions of the recording system.

Further, according to the present invention, it is possible to readily record, in response to only the simultaneous recording command being given, the sound data, recorded in the plurality of first devices, into the plurality of tracks, sharing the same time axis in the second device, while distinguishing between the first devices (human players or terminals). For example, in a case where the present invention is used in recording of a group music performance, performance sounds of the entire group can be readily recorded into the plurality of tracks separately on a player-by-player or performance-part-by-performance-part basis, or into a separate track for each human player or performance pert.

BRIEF DESCRIPTION OF DRAWINGS

Certain preferred embodiments of the present invention will hereinafter be described in detail, by way of example only, with reference to the accompanying drawings, in which:

FIG. 4 is a diagram showing an example of a main screen displayed on the management device:

FIG. 5 is a diagram showing an example of a main screen displayed on the terminal device;

FIG. 6 is a diagram showing an example of a setup screen displayed on the terminal device;

FIG. 7 is a diagram showing an example of a group set screen displayed on the management device;

FIG. 9 is a diagram showing an example of a new player screen displayed on the management device:

FIG. 11 is a diagram showing an example flow of recording operations in the recording system of FIG. 1;

FIGS. 14A and 14B are flow charts of examples of processing performed in response to a recording stop instruction in the management device, in which FIG. 14A shows an example of processing performed in the management device and FIG. 14B shows an example of processing performed in the terminal device;

FIG. 15 is a flow chart showing an example of sound data reception processing;

DETAILED DESCRIPTION

Now, with reference to the accompanying drawings, a description will be given of embodiments of the present invention.

Figure 1:
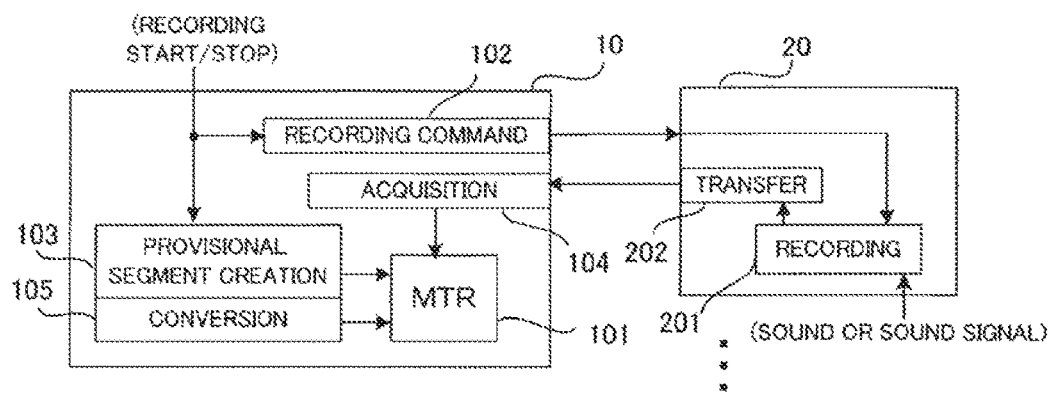
FIG. 1 is a block diagram explanatory of example constructions of a management device and terminal devices that constitute a recording system of the present invention.

FIG. 1 is a block diagram explanatory of example conceptual constructions of a management device 10 and terminal devices 20 that constitute a recording system of the present invention. Here, it is necessary to interconnect the management device 10 and the terminal devices 20 via some network, such as Wi-Fi, Bluetooth (registered trademark), ZigBee, Wimax, Ethernet (registered trademark) or other network. One example of the recording system of the invention includes a plurality of terminal devices 20 (first devices) and one management device 10 (second device).

The management device 10 is constructed by installing, into a desired device or equipment provided with one or more processors capable of executing computer programs, an application program (hereinafter referred to as "recording system application for management device") for causing the desired device or equipment to operate as the management device of the recording system of the present invention. Such equipment is, for example, a lap-top personal computer, a tablet terminal, or the like.

The management device 10 (second device) has a plurality of tracks associated with the plurality of terminal devices 20 (first devices); specifically, these tracks are provided in multi-track recording circuitry 101 ("MTR"). The management device 10 (second device) includes recording command circuitry 102 which issues, for example in response to an instruction of a user (later-described conductor 110), a simultaneous recording command that instructs, via a network, the plurality of terminal devices 20 (first devices) to perform simultaneous recording of sound data. The management device 10 (second device) further includes provisional segment creation circuitry 103, acquisition circuitry 104, and conversion circuitry 105. In response to the simultaneous recording command, the provisional segment creation circuitry 103 creates a provisional segment, specifying a time of the simultaneous recording, in each of the provisional segments. The acquisition circuitry 104 acquires, from the individual terminal devices 20 via the network, sound data recorded simultaneously in the individual terminal devices 20 in response to the simultaneous recording command. The conversion circuitry 105 records the sound data, acquired from each of the terminal devices 20, into the provisional segment created in the corresponding track and thereby converts the provisional segment to an actual segment having the sound data actually recorded therein. Note that the "provisional segment" is a segment on the track in which a recording time segment has been set but no sound data has not yet been recorded. By contrast, the "actual segment" is where sound data has been actually recorded in the provisional segment set on the track; the same segment on the track is converted from the provisional segment to the actual segment by the sound data being actually recorded into the segment. As an example, the management device 10 (second device) may include one or more processors configured to perform the functions of the above-mentioned recording command circuitry 102, provisional segment creation circuitry 103, acquisition circuitry 104, conversion circuitry 105, etc. As another example, the management device 10 (second device) may be configured to perform the functions of the above-mentioned recording command circuitry 102, provisional segment creation circuitry 103, acquisition circuitry 103, conversion circuitry 105, etc. by dedicated electronic circuitry (integrated circuitry)

More specifically, the above-mentioned simultaneous recording command (instruction) given by the recording command circuitry 102 includes a recording start instruction and a recording stop instruction. As an example, the recording command circuitry 102 may be configured to inform each of the terminal devices 20 of identification information for identifying a recording that corresponds to the simultaneous recording command. Namely, each time the recording command circuitry 102 issues a simultaneous recording command on a different occasion, the recording command circuitry 102 informs each of the terminal devices 20 of the identification information for identifying a recording that corresponds to the simultaneous recording command. The provisional segment creation circuitry 103 may be configured to, in response to the recording start command and the recording stop command, create the provisional segment from the recording start time to the recording stop time and associate the above-mentioned identification information with the created provisional segment. For example, the identification information includes, as one information identifying the provisional segment, time information indicative of a time on a time axis of a track of the management device 10 at which a recording start request has been made. Note that the provisional segment creation circuitry 103 need not necessarily start the creation of the provisional segment in response to the recording start as long as the circuitry 103 creates the provisional segment from the recording start time to the recording stop time.

The terminal device 20 is constructed by installing, into a desired device or equipment having a program-executing computer function, an application program (that is referred to as a recording system application for terminal device) for causing such a device or equipment to operate as a terminal device of the recording system of the invention and executing the installed recording system application. The equipment is, for example, a smartphone, tablet terminal, or the like.

The terminal device 20 includes recording circuitry 201 that records sound data in response to a command given from the management device 10, and transfer circuitry 202 that transfers to the management device 10 the sound data recorded in response to the command with the instructions. More specifically, the recording circuitry 201 stars recording of the sound data in response to a recording start command and stops the recording of the sound data in response to a recording stop command. Further, the transfer circuitry 202 may be configured to add identification information, informed together with the recording command given from the management device 10, to the sound data recorded in response to the recording command and transfer the sound data having the identification information added thereto.

Figure 2:
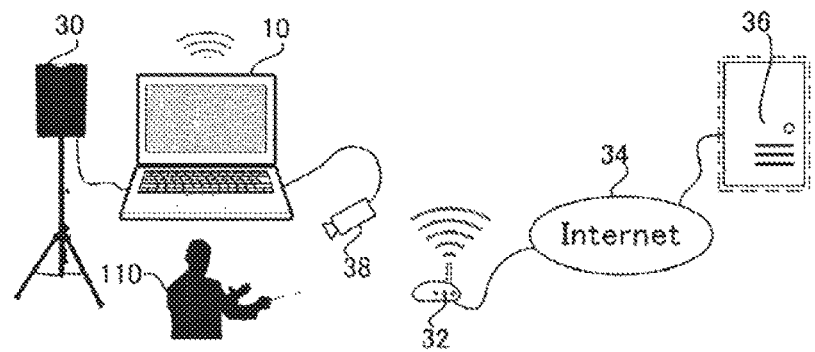
FIG. 2 is a diagram explanatory of an example application of the recording system of the present invention.

FIG. 2 is a diagram explanatory of an example application of the recording system shown in FIG. 1, in which the recording system is used for recording a performance of a brass band. In the illustrated example of FIG. 2, a conductor 110 of the brass band operates the management device 10, and individual human players 120 of the brass band prepares the terminal devices 20. The terminal devices 20 are placed, for example, on music stands of the individual human players 120 in such a manner that sounds performed by the corresponding player 120 can be recorded. Note that in the following description, the conductor 110 operating the management device 10 will hereinafter be referred to also as "operator" and the human players 120 operating the terminal devices 20 will hereinafter be referred to also as "users".

The following lines describe an outline of an example of recording performed by the recording system shown in FIG. 2. First, (1) in response to a recording start instruction given from the conductor 110, the management device 10 commands each of the terminal devices 20 to start recording (recording command circuitry 102). In response to such a command (instruction), the terminal devices 20 simultaneously start recording of sound data (recording circuitry 201). At this time, the management device 10 starts, in response to the instruction, creating provisional segments in the tracks associated with the individual terminal devices 20 (provisional segment creation circuitry 103). For example, after performing a recording-start instructing operation via the management device 10, the conductor 110 instructs each of the terminal devices 20 to start a performance. Once each of the human players 120 starts a performance, sound data indicative of a musical instrument sound performed by the human player 120 is recorded into the corresponding terminal device 20.

(2) The conductor 110 instructs each of the human players 120 to stop the performance and then performs a recording-stop instructing operation via the management device 10. In response to such an instruction, the management device 10 commands, via the network, each of the terminal devices 20 to stop the recording (recording command circuitry 102). In response to such a command, each of the terminal devices 20 stops the recording (recording circuitry 201). At this time, the management device 10 stops the creation of the provisional segment in each of the tracks (provisional segment creation circuitry 103). Because the start and stop of the provisional segment creation in each of the tracks are effected at the same timing as the start and stop of the recording in each of the terminal devices 20, the provisional segment on each of the tracks has the same time interval as the sound data recorded in the corresponding terminal device 20; that is, the provisional segment in each of the tracks specifies a time interval of the recorded sound.

(3) Each of the terminal devices 20 transfers the recorded sound data to the management device 10 via the network (transfer circuitry 202). The management device 10 acquires the sound data from the individual terminal devices 20 (acquisition circuitry 104), records the acquired sound data in association with the provisional segments created in the corresponding tracks, and thereby converts the provisional segments into actual segments (conversion circuitry 105).

Because the individual tracks are associated with the terminal devices 20 as set forth above, it is possible to automatically associate the human players 120 (or terminals) and the tracks with each other. Further, because the provisional segment of each of the tracks has the same time axis as the sound data recorded by the terminal device 20, it is possible to readily record, into the individual tracks of the multi-track recording circuitry 101, the sound data recorded by the corresponding terminal devices 20 (i.e., performance sounds of the individual human players 120), with the respective time axes aligned, by merely converting the provisional segments into the actual segments on the basis of the sound data acquired from the individual terminal devices 20. Thus, the performance sounds of the entire brass band, containing the performance sounds of the individual human players 120, can be recorded into the plurality of tracks separately for individual ones of the human players 120 or terminals sharing the time axis of the multi-track recording circuitry 101, i.e., in separate tracks corresponding to the individual players 120 or terminals.

Figures 3A, 3B:
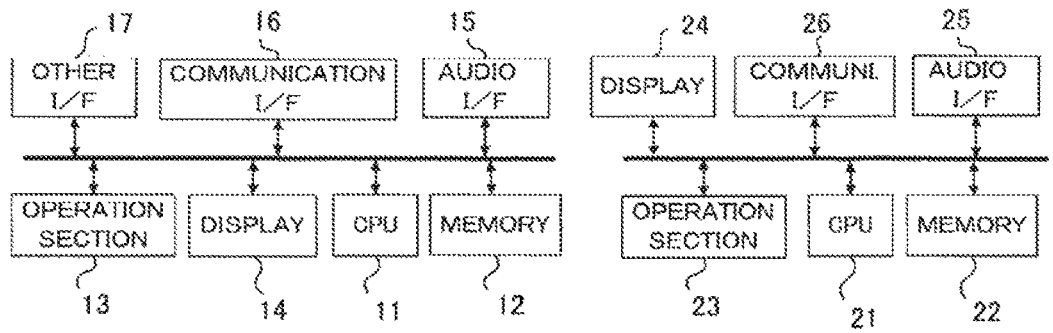
FIG. 3A is a block diagram showing an example electrical hardware construction of the management device.
FIG. 3B is a block diagram showing an example electrical hardware construction of each of the terminal devices.

FIG. 3A is a block diagram showing an example electrical hardware construction of the management device 10. The management device 10 includes: a CPU (Central Processing Unit) 11; a memory 12 including a ROM (Read-Only Memory), a RAM (Random Access Memory), and a hard disk; an operation section 13, a display device 14, an audio interface (I/F) 15, a communication interface (I/F) 16, and other interfaces (I/Fs) 17 including general-purpose interfaces for connecting external equipment etc. to the management device 10, and these components are interconnected via a communication bus 18. The CPU 11 controls operation of the management device 10 by executing various programs stored in the memory 12. The CPU 11 may comprise one or more processors rather than just one processor. The recording system application for management device, other application programs and control programs are stored in the memory 12 in a non-volatile manner, and in addition, various data including values of various parameters necessary for operation of the recording system are stored in the memory 12. Namely, the application programs for implementing the recording apparatus and recording method of the present invention are stored in a non-transitory, computer-readable storage medium, such as the memory 12, and executed by one or more processors, such as the CPU 11.

The display section 14 displays various screens under the control of the CPU 11. The operation section 13 includes an input mechanism, such as a keyboard, so as to receive various operational inputs. The audio I/F 15 includes an A/D converter, a D/A converter, a microphone, a speaker, etc., in such a manner that, via the audio I/F 15, the management device 10 can, for example, receive a sound or analogue sound signal from the outside to supply corresponding sound data, convert supplied sound data into a sound or analogue signal to output the thus-converted sound or analogue signal to the outside. Further, the management device 10 is connected with the plurality of terminal devices 20 via a wired or wireless network connected via the communication I/F 16 in such a manner that it can transmit and receive sound data and commands to and from the terminal devices 20. The communication I/F 16 corresponds to the recording command circuitry 102 and the acquisition circuitry 104 of FIG. 1. The management device 10 can also be connected to the Internet 34 via the communication I/F 16 and communicate with a cloud server 36 on the internet. Further, the management device 10 can be connected to external equipment, such as a video camera 38, via the other I/Fs 17.

As an example, the memory 12 belonging to the management device 10 can be used as a hardware resource that functions as the multi-track recording circuitry 101. As another example, a memory device provided on an external communication network with which the management device 10 can communicate via the communication I/F 16 may be used as a hardware resource that functions as the multi-track recording circuitry 101. A memory device managed by the cloud server 36 may be used as such a memory device provided on the external communication network.

FIG. 3B is a block diagram showing an example electrical hardware construction of each of the terminal devices 20. The terminal device 20 includes: a CPU (Central Processing Unit) 21; a memory 22 including a ROM, a RAM, and a hard disk; an operation section 23 for inputting characters and symbols, a display device 24, an audio I/F 25, and a communication I/F 26, and these components are interconnected via a communication bus 27. The CPU 21 controls operation of the terminal device by executing various programs stored in the memory 22. A recording system application for terminal device, other application programs and control programs are stored in the memory 22 in a non-volatile manner, and in addition, various data including values of various parameters necessary for operation of the recording system are stored in the memory 22.

The display device 24, which is for example a touch panel display, displays various screens under the control of the CPU 21. The operation section 23 includes an input mechanism of the touch panel display so as to receive various operational inputs to the various screens displayed on the display device 24. Further, the terminal device 20 is connected with the management device 10 via the wired or wireless network connected with the device 20 via the communication I/F 26. Furthermore, the terminal device 20 is connectable to the Internet via the communication I/F 26 in such a manner that it can communicate with the cloud server 36 on the Internet. Furthermore, via the audio I/F 25, the terminal device 20 can, for example, receive a sound or analogue sound signal from the outside and output a sound or analog signal to the outside. The communication I/F 26 corresponds to the transfer circuitry 202 of FIG. 1.

FIG. 4 shows an example of a main screen 40 displayed on the display device 14 of the management device 10. The CPU 11 of the management device 10 displays the main screen 40 on the display device 14 in response to a start-up of the recording system application. The main screen 40 is a screen which displays an outline relating to various forms of music production, such as sound data recording, reproduction, editing, etc., and on which various operations relating to the music production can be performed. Various pieces of information relating to recording and reproduction of the tracks of the management device 10 are stored in a single project file as is the case with an ordinary DAW (that will be described later), and the display on the main screen 40 is carried out on the basis of such information. A plurality of such project files can be stored in the memory 12 of the management device 10. The operator uses a file-open button 42 to cause the management device 10 to read a desired one of the project files. The project file having been read by the management device 10 will hereinafter be referred to as a "current project". A store button 43 is used by the operator to cause the terminal device 10 to overwrite various information of the current project to the original project file that is a read-from source of the information. A recording button 45 and a reproduction button 46 are used to instruct starting and stopping of sound data recording and reproduction. If the operator operates the recording button 45 while the recording button 45 is OFF, such an operator's operation serves as an instruction for starting of sound data recording. If the operator operates the recording button 45 while the button 45 is ON, on the other hand, such an operator's operation serves as an instruction for stopping of sound data recording. Similarly, if the operator operates the reproduction button 46 while the button 46 is OFF, such an operator's operation serves as an instruction for starting of sound data reproduction. If the operator operates the reproduction button 46 while the button 46 is ON, on the other hand, such an operator's operation serves as an instruction for stopping of sound data reproduction. Let it be assumed here that starting of sound data reproduction cannot be instructed during sound data recording, and that starting of sound data recording cannot be instructed during sound data reproduction.

A plurality of belt-shaped images 41, each extending in a horizontal direction of a track of a human player p (described later), are displayed on the main screen 40 in such a manner that the belt-shaped images 41 adjoin one another in a vertical direction of the screen 41. In an event section that is a right section of each of the tracks 41 are displayed images of a waveform event 415 indicative of recorded sound data (actual segment) and a provisional event 410 indicative of a provisional segment In the track 41, the horizontal axis is associated with the time axis, and positions and sizes of the waveform event 415 (actual segment) and the provisional event 410 (provisional segment) indicate a time position and a length of the waveform event 415 (actual segment). Note that a time cursor (not shown) for indicating current times of recording and reproduction of the current project is displayed in the event section as a vertical bar extending across all of the tracks. Such a recording screen having the plurality of tracks may be constructed by applying well-known techniques in a computer-based music production system (DAW or Digital Audio Workstation). The individual tracks 41 of the main screen 40 correspond to the multi-track recording circuitry 101.

Further, in a list section that is a left section of each of the tracks are displayed a performance part name, such as "Trumpet", and a human player's name (or user's name), such as "Harry", as information identifying the human player p associated with the track. Further, in the list section of each of the tracks 41 are provided mute ON/OFF 401, a solo ON/OFF button 402, a Rec Enable button (hereinafter, RE button) 403 for switching between recording valid and invalid states, and a monitor On/OFF button 404. The operator can use these buttons to control values of corresponding parameters on a track-by-track basis. Furthermore, each of the tracks 41 includes an identification button 405 for identifying the associated terminal device 20. When the operator operates the identification button 405 of any one of the tracks, and if there is a terminal device 20 corresponding to that track, the operator can identify which one of the terminal devices 20 corresponds to the track 41, for example, by the screen of the terminal device 20 in question being flashed. An online state display 406 displays whether the terminal device 20 corresponding to the track 41 is currently online with the track 41 of the management device 10. Note that the state in which the terminal device 20 is currently on line with the track 41 of the management device 10 means a state in which the terminal device 20 is currently associated with the track 41 of the management device 10 and can receive remote control from the management device 10.

In one embodiment, the management device 10 groups the terminal devices 20 into groups called "recording groups" and manages participation in recording of the recording groups. As an example, group information relating to the recording groups can be recorded for each of the plurality of project files. Only terminal devices 20 for which a key of a recording group is set can participate in recording of the current project. In other words, the CPU 11 permits participation in recording of each terminal device 20 on the basis of information of a recording group specified in the project file (see later-described step S2).

A recording group of the current project can be set by use of a "Group" button 44. In response to an operation of the "Group" button 44, the CPU 11 of the management device 10 displays a setup screen 50 of FIG. 5 on the display device 14. The setup screen 50 has a group name display section 51 and an authentication key display section 52 for the operator to make settings. More specifically, the group name display section 51 is a section which is provided for the operator to set a recording group name that is public information and in which a currently set recording group name is displayed. In the group name display section 51, the operator inputs text of the recording group name. The authentication key display section 52 is a section which is provided for the operator to input text of an authentication key that is non-public information necessary for participation in a recording group. Once the operator operates an OK button 53, changes of the group name and authentication key made on the setup screen 50 are ultimately determined or established as group information of the current project file, and then, the display on the setup screen 50 is erased. Once the operator operates a Cancel button 54, the changes made on the setup screen 50 are canceled, and then, the display on the setup screen 50 is erased. Note that, for the group name display section 51, arrangements may be made to allow the user to select and input a desired group name from group names informed from a plurality of control devices 10 on the network or a history of previously input group names instead of inputting text of the group name as above, because the group name is public information.

FIG. 6 shows an example of a main screen 60 displayed on the display device 24 of the terminal device 20. The CPU 21 of the terminal device 20 displays the main screen 60 on the display device 24 in response to a start-up of the recording system application. On the main screen 60 of the terminal device 20 are displayed a group name ("Group") of a currently selected recording group, and a performance part name ("Part: Flute") and a user name ("Name: Franz") as player information ("Player").

Further, the main screen 60 has a recording button 601, a reproduction button 602, a time bar 603 indicative of an in-segment time position of sound data being currently recorded or reproduced, a display section 604 that displays identification information (waveform ID) of the sound data being currently recorded or reproduced, a reproduced-sound mute button 605, and a sound volume control bar 606. Various control relating to operations, such as recording, reproduction, etc., in the terminal device 20 can also be performed by using the above-mentioned image components 601 to 606. A segment ID displayed on the segment ID display section 604 is, for example, time information at which the recording of the sound data has been started.

A setup ("Setup") button 61 is used by the user to display a setup screen relating to a recording group and player information. A connection ("Connect") button 62 is used to instruct connection/disconnection to/from the management device 10. Further, a "Rec Enable" check box 63 is used to check/instruct the recording valid/invalid state in the terminal device 20 in question. A "Control Master" checkbox 64 is used to check/set whether or not the terminal device 20 in question should be used as a remote control master that instructs a recording start/stop in the recording system. Once the user checks the checkbox 64, the terminal device 20 in question becomes the remote control master such that it remote-controls the recording start/recording stop of the management device 10 and the other terminal devices 20. Note that the description will be given assuming that the checkbox 64 of any one of the terminal devices 20 is not checked and the management device 10 is the remote control master, to simplify the description.

In response to a user's operation of the setup button 61, the CPU 21 of the terminal device 20 displays a setup screen 70 of FIG. 7 on the display device 24. The setup screen 70 includes a group name display section 71, an authentication key display section 72, a performance part name display section 73 and a user name display section 74 that are provided for the user to make settings. The group name display section 71 is a section for the user to set a group name of a recording group, and a currently set group name is displayed in the group name display section 71. Information set and displayed in the display sections 71 to 74 is the group name of the current recording group, the authentication key of the current recording group name, and current player information (i.e., performance part name and user name). The user of the terminal device 20 can use the individual display sections 71 to 74 to select the recording group, input the authentication key, and input and change respective text of the performance part name and user names. Further, information (device ID) identifying the terminal device 20, such as a MAC address, is also displayed on the setup screen 70. Note that the information (device ID) identifying the terminal device 20 need not necessarily be the MAC address and may be any other information as long as the other information can identify the terminal device 20.

As an example, the setup screen 70 has a plurality of preset selection buttons 75 ("A" to "D" in FIG. 7). Each of the terminal devices 20 has information relating to a plurality of recording groups ("group names", "authentication keys", "performance part names" and "user names") as presets retained in the memory 22. Any one of the presets is associated with each of the preset selection buttons 75. Once the user operates anyone of the preset selection buttons 75, various information of the preset corresponding to the operated button 75 is set automatically. Because various information relating to the recording groups are retained as a plurality of presets as above, it is possible to save information-inputting time and labor for changing the recording group in accordance with the currently participating group, for example, in a case where the user belongs to a plurality of groups.

The following lines describe an example procedure to be performed when the terminal device 20 attempts to newly participate in a given recording group. The user of the terminal device 20 sets on the setup screen 10 the same recording group as that of the current project of the management device 10. Then, by operating the connection button 62 (that is in an OFF (or deilluminated) state), the user causes the terminal device 20 to make a request for participating in the current project, i.e., a request for connecting to a track of the current project (or a request for being associated to the track). When the terminal device 20 is not currently connected to a track of the management device 10, the connection button 62 is used to instruct the terminal device 20 to request connection to the management device 10, but when the terminal device 20 is currently connected to a track of the management device 10, the connection button 62 is used to instruct the terminal device 20 to request disconnection from the management device 10. As an example, the connection button 62 may be constructed in such a manner that its display style (e.g., its display color) differs between when the terminal device 20 is not currently connected to the management device 10 and when the terminal device 20 is currently connected to the management device 10; for example, the connection button 62 may be illuminated when the terminal device 20 is currently connected to the management device 10 and deilluminated when the terminal device 20 is not currently connected to the management device 10.

Figures 8A, 8B:
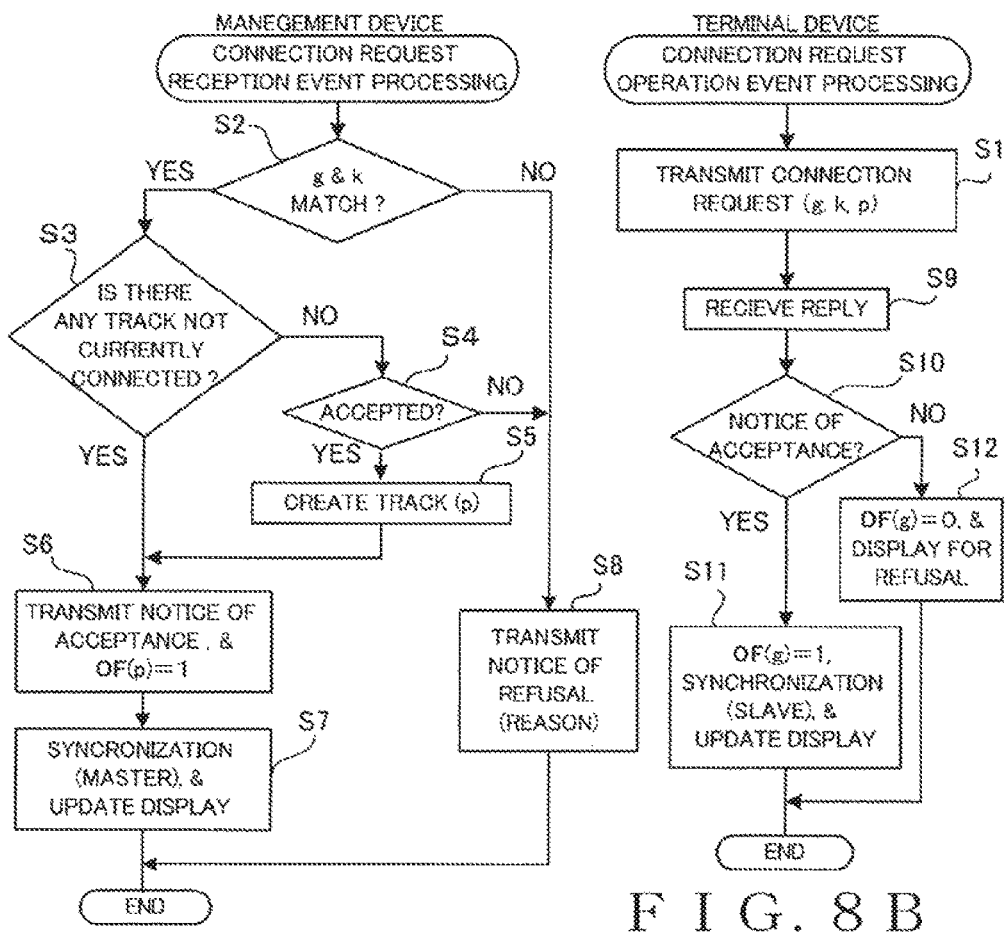
FIG. 8A is a flow chart showing an example of processing performed in the management device in response to a connection request.
FIG. 8B is a flow chart showing an example of processing performed in the terminal device in response to the connection request.

FIGS. 8A and 8B are flow charts of examples of processing performed in response to the user instructing the terminal device 20 to make a "connection request" by operating the connection button 62 when the button 62 is in the deilluminated state in the terminal device 20. Specifically, FIG. 8A shows an example of processing performed in the management device 10, and FIG. 8B shows an example of processing performed in the terminal device 20. Let it be assumed here that the terminal device 20 has recognized or identified in advance the management device 10 connected to the network and that the connection button 62 is operable by the user only when the management device 10 is present. In response to the above-mentioned connection request instruction, the CPU 21 of the terminal device 20 transmits the connection request to the identified management device 10 at step S1 of FIG. 8B. The connection request thus transmitted includes: group name information g indicative of a group name; authentication key information k; and player information p identifying, on the basis of a user name and a performance part, which of the human players the user in question is. In a case where a plurality of management devices 10 have been identified in advance, the terminal device 20 transmits the connection request sequentially to the plurality of management devices 10 until the terminal device 20 can be connected to any one of the management devices 10, details of which will be discussed later.

When the CPU 11 of the management device 10 has received the connection request from the terminal device 20, the CPU 11 starts the processing of FIG. 8(*a*). At step S2, the CPU 11 collates the group name g and authentication key k included in the received connection request with the group name of the recording group of the current project and the authentication key of the recording group.

If both of the group name g and authentication key k included in the received connection request match the group name and authentication key of the current project (yes determination at step S2), the CPU 11 determines at step S3 whether there is any track that is associated with the human player p included in the received connection request and whether that track is not currently connected.

If there is no track that is associated with the human player p, or if the track associated with the human player p is currently connected (no determination at step) step S3, the CPU 11 determines at step S4 whether the connection request should be accepted or refused. If the associated track (p) is currently connected, the CPU 11 immediately determines that the connection request should be "refused" and then goes to step S8. If there is no such track (p), the CPU 11 receives from the operator an instruction as to whether the connection request should be accepted or refused. FIG. 9 shows an example of a dialogue screen 90 that is displayed at step S4 for receiving the instruction from the operator. The names etc. based on the name g. key k and name p included in the connection request are displayed on a group name display section 91, a performance part name display section 92, and a user name display section 93 of the dialogue screen 90. If the operator operates an "Accept" button 94, the CPU 11 determines that the connection request should be accepted and goes to step S5. But, if the operator operates a "Refuse" button 95, the CPU 11 determines that the connection request should be refused and goes to step S8. Once the connection request is accepted (yes determination at step S4), the CPU 11 goes to step S5 to newly create a track (p) associated with the human player p included in the connection request. The track (p) is a player track designated by the performance part and user name indicated by the human player p. If the terminal device 20 having the human player p set therein is connected to the current project for the first time, a track (p) is newly created in the current project at steps S4 and S5. At this time, the newly created track (p) is added to the main screen 40.

If there is any track (p) that is associated with the human player p and the track (p) is not correctly connected (yes determination at step S3), and if the track (p) is newly created at step S5, the CPU 11 goes to step S6, where the CPU 11 not only transmits a notice of acceptance of the connection request to the terminal device 20 that is a transmission source of the connection request, but also sets at a value "1" (online) an online flag OF(p) relating to the track (p). At the time point when the online flag OF(p) is set at the value "1", the connection is established, and the terminal device 20 is associated with the track (p) of the management device 10. Then, the CPU 11 proceeds to step S7, where the CPU 11 not only performs a synchronization process (synchronization "master") for conforming various settings of the terminal device 20, which is the transmission source of the connection request, to various settings (such as a recording valid/invalid state setting and a mute-on/off setting) of the track (p), but also displays "currently on line" in the online state display 406 of the track (p) on the main screen 40.

If any one of the group name g and authentication key k included in the connection request does not match a corresponding one of the group name and authentication key of the current project (no determination at step S2), or if it has been determined that the connection request should be refused (no determination at step S4), the CPU 11 goes to step S8, where the CPU 11 transmits a notice of refusal to the terminal device 20, which is the transmission source of the connection request, together with a reason for the refusal, such as "the group name or the authentication key does not match", "the track (p) is currently online", or "the operator has refused". Note that the online flag OF(p) is set at a value "0" (not online, i.e., off line) in response to a disconnection request transmitted from the terminal device 20 to the management device 10 in response to the user of the terminal device 20 operating the connection button 62 when the button 62 is in the illuminated state. Further, when the management device 10 reads another project file into the device 10, or when the management device 10 stops operating as the management device 10 by deactivating the recording system application for management device, the online flags OF(p) for all of the human players p of the current project file are set at the value 0 (offline).

Referring back to FIG. 8B, after completion of step S1, the CPU 21 of the terminal device 20 at step S9 receives the notice of acceptance (see step S6 above) or the notice of refusal (see step S8 above) transmitted from the management device 10. Once the CPU 21 receives the notice of acceptance from the management device 10 (yes determination at step S10), the CPU 21 proceeds to step S11 to set at the value 1 (online) the online flag OF(g) of the current recording group of the terminal device 20. At the time point when the online flag OF(g) is set at the value "1" as above, the connection is established, and the terminal device 20 is associated with the track (p) of the management device 10. Then, the CPU 21 performs a synchronization process (synchronization "slave") for conforming various settings of the terminal device 20 to various settings of the track (p) of the management device 10, illuminates the connection button 62 of the main screen 60 in accordance with results of changes of the various settings, updates the check display of the check box 63, and then ends the processing. Note that in the case where a plurality of management devices 10 have been identified in advance, the terminal device 20 repeats the processing of FIG. 8B sequentially for the individual management devices 10 until the terminal device 20 receives a "notice of acceptance" from any one of the management devices 10. Namely, the processing of FIG. 8B is performed first for one of the management devices, in which if the "notice of acceptance" is received from that management device, the connection is established, or if the "notice of refusal" is received from that management device, the processing of FIG. 8B is performed for a next one of the management devices, and so on. In this case, if the "notice of refusal" is received from all of the management devices, it means that the connection has failed. Once the connection is established as above, the CPU 21 of the terminal device 20 sets the associated track (p) of the management device 10 as a transmission destination of sound data.

If the notice of refusal is received from the management device 10 (no determination at step S1), the CPU 21 at step S12 not only sets the online flag OF(g) of the current recording group g at the value 0 (offline) and deilluminates the connection button 62, but also displays a reason for the refusal on the display device 24 and ends the processing.

The terminal device 20 having the notice of acceptance is placed online with the management device 10 through the operation of step S6 of FIG. 8A and the operation of step S11 of FIG. 8B, in such a manner that the terminal device 20 is subjected to various remote control by the management device 10 based on various commands (including a recording command, reproduction command, etc.). Note that any one of the terminal devices 20 may be set as the remote control master in such a manner that the thus-set terminal device 20, rather than the management device 10, issues a recording command, reproduction command, etc. in the recording system.

For example, once the operator 110 operates the RE button 43 of any one of the tracks 41 on the main screen 40 of FIG. 4, the CPU 11 of the management device 10 inverts a value of a Rec Enable parameter (hereinafter "RE") of the track and commands the corresponding terminal device 20 to change the value of the RE. In response to such a command, the CPU 21 of the terminal device 20 changes the value of the RE to the same value as changed by the management device 10. The RE is a parameter for switching between valid and invalid states (enabled and disabled states) of recording; when the RE is "1", the recording is valid in such a manner that recording is performed for the track in response to a recording instruction given, while the RE is "0", the recording is invalid in such a manner that recording is not performed for the track regardless of a recording instruction. Note that of the RE buttons of the plurality of tracks, the operator can operate only the RE button of each track for which the terminal device 20 is currently online, but the operator cannot set at "1" (recording valid) the RE of each track for which the terminal device 20 is currently offline.

Figures 10A, 10B:
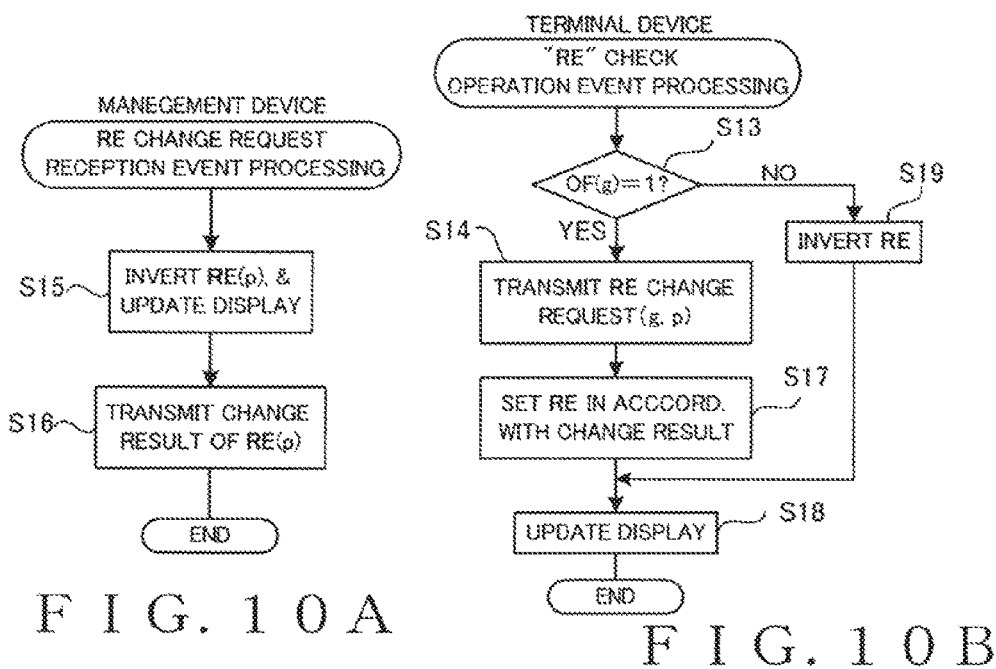
FIG. 10A is a flow chart showing an example of processing performed in the management device in response to a user's RE button operation.
FIG. 10B is a flow chart showing an example of processing performed in the terminal device in response to the user's RE button operation.

As an example, the value of the RE can also be changed from the terminal device side in response to a local instruction of the user of the terminal device 20. The user 120 of the terminal device 20 can change the value of the RE of the terminal device 20 by using the "Rec Enable" check box 63 of the main screen 60. FIGS. 10A and 10B are flow charts showing an example of processing performed upon detection of a user's operation of the check box 63, in which FIG. 10A shows an example of processing performed in the management device 10 while FIG. 10B shows an example of processing performed in the terminal device 20.

In response to a user's operation of the check box 63, the CPU 21 of the terminal device 20 determines at step S13 whether or not the online flag is OF(g=1) (online). If the online flag is OF(g)=1 (yes determination at step S13), the CPU 21 of the terminal device 20 goes to step S14 to transmit an RE change command to the management device 10 that is currently online. The RE change command includes a group name (g) of a currently selected recording group and player information (p).

In response to the RE change command from the terminal device 20 that is currently online, the management device 10 starts the processing of FIG. 10A. At step 15, the CPU 11 of the management device 10 identifies, on the basis of the group name (g) and player (p) included in the RE change command, a track (p) of the terminal device 20 that is the transmission source of the command, inverts the value of the RE(p) of the identified track (p), and updates the display of the main screen 40. At step S16, the CPU 11 transmits a change result of the value of the RE(p) to the terminal device 20 that is the transmission source of the command, and then ends the processing.

The CPU 21 of the terminal device 20 having received the change result of the value of the RE(p) from the management device 10 that is currently online sets the value of the RE of the terminal device 20 at the same value as the changed value of the RE(p) received from the management device 10, at step S17. Then, the CPU 21 updates the display of the "Rec Enable" checkbox 63 in accordance with the change result at step S18, and then ends the processing. In this manner, the RE of the terminal device 20 is set at the same value as the changed value of the RE(p) received from the management device 10.

Further, if the online flag is OF(g)=0 (offline) when a user's operation of the "Rec Enable" checkbox 63 has been detected (no determination at step S13), the CPU 21 of the terminal device 20 inverts the value of the RE of the terminal device 20 at step S19, updates the display of the "Rec Enable" checkbox 63 in accordance with the changed value of the RE at step S18, and then ends the processing. In this case, the set value of the RE locally controls the recording valid/invalid state of sound data in the terminal device 20, regardless of the track.

Let it be assumed here that none of the management device 10 and the terminal devices 2 can change the value of the RE while recording is being performed in the recording system. Namely, during the recording, operations of any of the Rec Enable buttons 43 of the individual tracks 41 on the main screen 40 of the management device 10 and the "Rec Enable" checkbox 63 on the main screens 60 of the individual terminal devices 20 are made invalid. It is also assumed here that the RE(p) of each track for which the terminal device 20 is not currently online is always 0 and cannot be set at 1. Thus, if the RE(p) is 1 in the management device 10, it definitely means that the corresponding track (p) is currently online.

Next, a description will be given of examples of processing performed by the management device 10 and the terminal device 20 when recording is to be performed in the recording system. FIG. 11 schematically shows states of events of the individual tracks displayed on the event section of the main screen 40 when sound data are to be multi-track-recorded into desired tracks of the current project of the management device 10. FIG. 11 shows an example where six tracks of track Nos. "1" to "6" exist. However, the number of the tracks is not limited to six and can be increased or decreased by the operator.

Figure 12A:
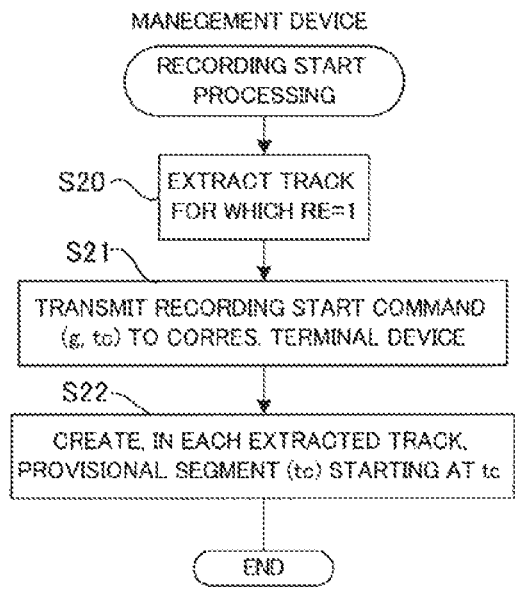
FIG. 12A is a flow chart showing an example of processing performed in the management device in response to a recording start request.
Figure 12B:
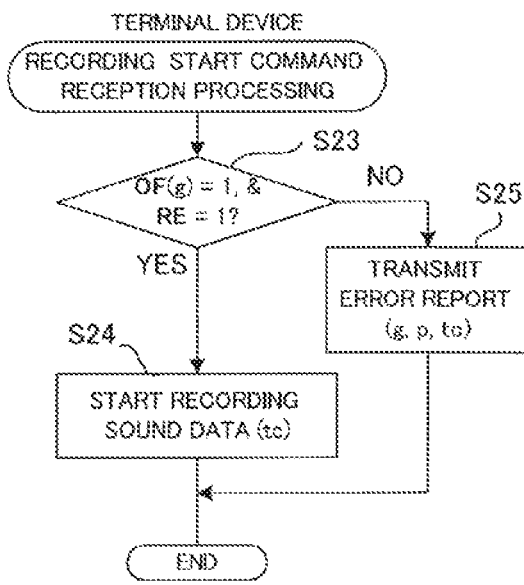
FIG. 12B is a flow chart showing an example of processing performed in the terminal device in response to the recording start request.

Let it be assumed here that the operator 110 (see FIG. 2) first sets the time cursor at a time point tc1 on the main screen 40 of the management device 10, instructs starting of recording by operating the recording button 45 that is currently in the OFF state, and then instructs stopping of the recording by operating the recording button 45, which is currently in the ON state, when the time cursor has advanced to a time point tc2 as the time passes. FIGS. 12A and 12B are flow charts of examples of processing responsive to such a recording start instruction, where FIG. 12A shows an example of processing performed in the management device 10 and FIG. 12B shows an example of processing performed in the terminal device 20.

At step S20 of FIG. 12A, the CPU 11 of the management device 10 references the memory 12 to check the values of the RE of all of the tracks 41, and then the CPU 11 extracts each track 41 for which the RE=1 (recording valid and currently online). Let it be assumed that in the example illustrated in the uppermost portion of FIG. 11, the RE is set at 1 for tracks "2", "3", "4", and "6" extracted from among tracks "1" to "6". In such a case, tracks "2", "3", "4", and "6" are extracted as objects of recording.

Then, at step S21, the CPU 11 of the management device 10 commands the terminal devices 20 corresponding to the extracted tracks to start recording. For example, such a recording start instruction is transmitted separately to each of the terminal devices 20. The recording start instruction includes a recording group name g and time information tc. The time information tc represents a time that is indicated by the time cursor at the time of the recording start instruction; here, the time is indicated, for example, by "hours, minutes, and seconds". In the illustrated example, the time information tc becomes a segment ID that identifies a segment of sound recorded in response to the recording start instruction, i.e., identification information for identifying a time segment of the recording responsive to the recording start instruction. The segment ID is not necessarily limited to the time information tc. For example, as the segment ID may be used a serial number updated each time a recording instruction is given, a random number generated each time a recording instruction is given, time information indicated by a system clock of the management device 10, or the like.

Then, at step S22, the CPU 11 of the management device 10 starts creating, in each of the extracted tracks and at the time point tc of the recording start command, a provisional segment (tc) identified by the time information tc. The "provisional segment" is recording event data having no substantive sound data, i.e., "empty" recording event data. In response to the start of the creation of the provisional segment (tc), the CPU 11 of the management device 10 displays on the main screen 40 a provisional event 410 (see FIGS. 4 and 11) in each of the extracted tracks 41. As an example, after the start of the recording, the CPU 11 of the management device 10 may update a displayed size of the provisional event 410 in real time during the recording in such a manner that the provisional event 410 gradually expands in the time axis direction as the recording time passes.

In the example illustrated in the uppermost portion of FIG. 11, the provisional segment (tc) starts being created in each of the tracks "2", "3", "4", and "6" at the recording start time point tc1. On the main screen 40, provisional events 410a to 410d starting at the recording start time point t are displayed in tracks "2", "3", "4", and "6", respectively.

On the other hand, in response to the recording start command from the management device 10, the CPU 21 of each of the terminal device 20 determines at step S23 whether or not OF(g)=1 and RE=1. If OF(g)=1 and RE=1 (yes determination at step S23), the CPU 21 goes to step S24 to start recording sound data input via the audio I/O 25. The sound data is accumulated into the memory 22 in association with the time information tc included in the recording start order. Through steps S23 and S24 above, all of the terminal devices 20 currently connected to the management device 10 simultaneously start recording the sound data. The sound data is, for example, digital audio waveform data obtained by converting analog waveform signals, acquired via microphones, into digital signals. With the start of the recording, the CPU 21 of the terminal device 20 changes a display style of the recording button 601 to one indicating that the recording is currently in progress. The change of the display style includes, for example, a change of a display color, design, and/or the like.

If at least one of the OF(g) and RE is "0" (offline or recording invalid) (no determination at step S23), the CPU 21 of the terminal device 20 goes to step S25 to transmits an error report to the management device 10 and then ends the processing. In this case, the error report transmitted by the CPU 21 of the terminal device 20 includes a recording group name g, player information p of the terminal device 20, and time information tc.

Figure 13:
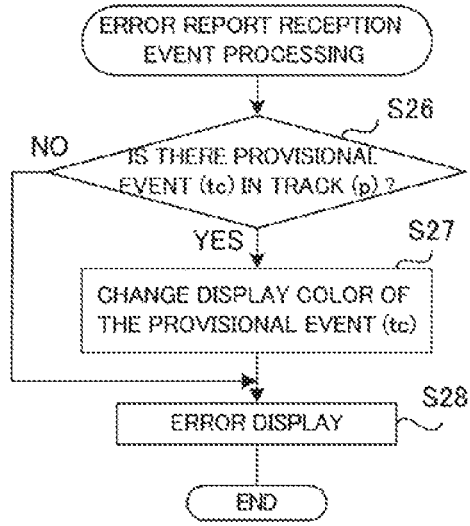
FIG. 13 is a flow chart of an example of processing performed in response to an error report.

FIG. 13 is a flow chart of an example of processing performed by the CPU 11 of the management device 10. If a provisional segment (tc) is currently being created in a track (p) associated with the player p included in the error report (yes determination at step S26), the CPU 11 of the management device 10 proceeds to step S27, where it updates the display of the main screen so as to make the display style (e.g., display color) of the provisional event 410, corresponding to the provisional segment (tc) of the track (p) in question, different from the display style of the display style of the other tracks (e.g., change the display color of the provisional event 410, corresponding to the provisional segment (tc) of the track (p) in question, to a red display color). Then, the CPU 11 of the management device 10 at step S28 displays on the display device 14 to the effect that a recording error has occurred, and then ends the processing. If a provisional segment (tc) is not being created in the track (p) associated with the player p included in the error report (no determination at step S26), on the other hand, the CPU 11 of the management device 10 displays on the display device 14 to the effect that a recording error has occurred, and then ends the processing. Thus, the operator 110 can identify that the recording error of the sound data has occurred in the terminal device 20.

Following the recording start through the processing of FIG. 12A and FIG. 12B, the recording start button 45 switches to a button operable to instruct stopping of the recording and functions as such a recording stop instructing button throughout the recording. Following the recording start, the CPU 11 of the management device 10 changes the display style of the recording button 45 to a style indicating that the recording is now in progress, or, in other words, to a style indicating that the button 45 is now operable to give a recording stop instruction. Hereinafter, the button 45 during the recording will be referred to as "recording stop button". The operator 110 instructs stopping of the recording by operating the recording stop button 45. FIGS. 14A and 14B are flow charts showing examples of processing performed in response to a recording stop instruction, where FIG. 14A shows an example of processing performed in the management device 10 while FIG. 14B shows an example of processing performed in the terminal device 20.

At step S29 of FIG. 14A, the CPU 11 of the management device 10 references the memory 12 to extract each track 41 where the RE is currently set at 1 (recording valid and online). Then, at step S30, the CPU 11 of the management device 10 commands each of the terminal devices 20 corresponding to the extracted tracks to stop the recording. As an example, the recording stop instruction is transmitted separately to each of the terminal device 20. The recording stop instruction includes a recording group name g and time information tc indicative of a start time of the recording. Then, at step S31, the CPU 11 of the management device 10 ends creation of a provisional segment in each of the extracted tracks. The CPU 11 of the management device 10 stores the time information tc, indicative of the start time of the recording, as a segment ID of the provisional segment created in each of the tracks. A time length (size) of the provisional segment created in each of the tracks is ultimately determined by the stopping of the recording. The provisional segment (tc) is created in response to the recording start command and recording stop command, located at the same time-axis position as the sound data to be recorded in response to the instructions, and has the same time length as the sound data. Further, based on the player information p and the segment ID of the provisional segment of each of the tracks, it is possible to identify to which of the sound data recorded in which of the online terminal devices the provisional segment of the track corresponds to (and identify when the recording of the sound data to which the provisional segment of the track corresponds was performed in the online terminal device). The operations of steps S21 and S30 correspond to operations performed by the recording command circuitry 102. Further, the operations of steps S22 and S31 correspond to operations performed by the provisional segment creation circuitry 103.

In the example illustrated in the uppermost portion of FIG. 1, provisional segments (provisional events 410a, 410b, 410c, and 410d) continuing from the time point tc1 to the time point tc2 are created at the recording stop time point tc2 in respective ones of tracks "2", "3", "4", and "6". As shown in FIG. 11, the provisional segments (provisional events 410a, 410b, 410c, and 410d) of tracks "2", "3", "4", and "6" each have a same time position and same time length from the time point tc1 to the time point tc2.

On the other hand, the CPU 21 of each of the terminal devices 20 at step S32 of FIG. 14B determines, in response to the recording stop command, whether or not sound data (tc) having as the segment ID the time information tc included in the recording stop command is currently being recorded. If such sound data (tc) is currently being recorded (yes determination at step S32), the CPU 21 of each of the terminal devices 20 stops the recording of the sound data (tc) at step S33. Thus, the recording of the sound data (tc) of the corresponding player p is made final in each of the terminal devices 20. The recorded sound data (tc) has the time information to added thereto as the segment ID identifying the segment of the sound data. Based on the time information tc, it is possible to identify which of the recording segments the sound data corresponds to (in which of the segments the sound data was recorded). Steps S23, S24, S32, and S33 correspond to operations performed by the recording circuitry 201.

The CPU 21 of the terminal device 20 at step S34 transfers the recorded sound data (tc) to the management device 10 after adding the recording group name g, player information p and time information tc to the recorded sound data, and then ends the processing. Step S34 corresponds to an operation performed by the transfer circuitry 202.

If no sound data (tc) is currently being recorded (no determination at step S32), it means that no sound data (tc) is currently being recorded due to some error and/or the like. Thus, in such a case, the CPU 21 of the terminal device 20 goes to step S35 to transmit to the management device 10 an error report including the recording group name g, player information p, and time information tc, and then ends the processing. In response to the error report, the CPU 11 of the management device 10, for example, changes a display color of the provisional event 410, corresponding to the error report, to an error color (red) to thereby inform the operator that a recording error has occurred in relation to that provisional event (steps S26 to S28 of FIG. 13).

The management device 10 receives, via the communication I/F 16, sound data (tc) transferred from each of the terminal devices 20. FIG. 15 is a flow chart showing an example of processing performed by the CPU 11 of the management device 10 upon receipt of the sound data (tc) having the recording group name g, player information p and time information tc added thereto. At step S36, the CPU 11 of the management device 10 determines whether or not a provisional segment (tc) having the time information p as its segment ID has been created in the track (p) corresponding to the player information p. If such a provisional segment (tc) has been created in the track (p) (yes determination at step S36), the CPU 11 of the management device 10 goes to step S37 to convert the provisional segment (tc) of the track (p) into an actual segment (tc) on the basis of the received sound data (tc), and then the CPU 11 ends the processing. The actual segment (tc) is a substantive recording event for which the corresponding sound data (tc) has been stored in the management device 10. Converting the provisional segment (tc) into the actual segment (tc) as above means storing the acquired sound data (tc) into the memory 12 in association with the track (p) of the current project. Further, at step S36 above, the CPU 11 of the management device 10 changes the provisional event 410 of the track (p) on the main screen 40 to a waveform event 415 indicative of the actual segment (tc). Step S36 corresponds to an operation performed by the acquisition circuitry 104, and step S37 corresponds to an operation performed by the conversion circuitry 105.

As an example, when converting the provisional segment (tc) to the actual segment (tc) at step S37, the CPU 11 of the management device 10 may adjust the time length of the sound data (tc) and/or finely adjust the time position of the sound data (tc) forward or backward by time-stretching the sound data (tc), as necessary. For example, such temporal adjustment synchronizes rises in amplitude of the sound data of the actual segments (tc) of desired two or more of the plurality of tracks 41. Namely, in a case where there is any time discrepancy among the sound data of the tracks 41, the time adjustment is performed so as to remove the time discrepancy. Here, the temporal adjustment may be performed using a well-known technique.

Upon receipt of sound data (tc) from the terminal device 20 of each human player p in the currently online state, the CPU 11 of the management device 10 performs processing of FIG. 15. By such processing, the CPU 11 of the management device 10 converts the provisional segment (tc) of each of the tracks (p) into an actual segment (tc). A plurality of provisional segments (tc) corresponding to sound data (tc) to be received from the plurality of terminal devices 10 have been created, at the time of the stopping of the recording, in the individual tracks (p) of the current project of the management device 10. By sequentially receiving the sound data (tc) from the individual terminal devices 20, the CPU 11 of the management device 10 can sequentially convert the corresponding provisional segments (tc) of the current project into actual segments (tc) and set the converted actual segments (tc) as a plurality of actual segments (tc) of the plurality of tracks (p) very easily without bothering the operator.

If there is no provisional segment (tc) in the track (p) corresponding to the player information (p) due to some accident (no determination at step S36 of FIG. 15), the CPU 11 of the management device 10 goes to step S38 to makes an error display on the display device 14 to the effect that sound data (tc) for which the operator did not instructed recording has been sent from the player p, and then the CPU 11 ends the processing.

For example, the example illustrated in the middle portion of FIG. 11 shows a case where, at a given time point after stopping of recording, the management device 10 has not yet received sound date (tc1) from two terminal devices associated with tracks 2 and 4 but has already received sound date (tc1) from two terminal devices associated with tracks 3 and 6. In this case, provisional segments (provisional events 410b and 410d) of tc1 of tracks 3 and 6 are converted into actual segments (waveform events 415b and 415d), and provisional segments (provisional events 410a and 410c) of tc1 of tracks 2 and 4 still remain as provisional segments. Thus, with the main screen 40 of the management device 10, it is possible to readily determine, for each recording segment (tc) of each of the tracks, whether or not corresponding sound data has been received from the associated terminal device 20.

Note that, for the provisional segments (provisional events 410a and 410c) of tc1 of tracks 2 and 4, sound data have just not been received yet, and such sound data (tc1) are supposed to be sent from the terminal devices 20 associated with tracks 2 and 4. Alternatively, however, arrangements may be made to allow the operator to attempt acquisition of the corresponding sound data at desired timing. For example, the operator may designate any provisional event (tc) 410 of any one of the tracks (p) for which sound data has not yet been acquired and then instruct acquisition of the sound data. In response to such an instruction, the CPU 11 of the management device 10 identifies the terminal device 20 corresponding to the human player p and then transmits a transfer command to the identified terminal device 20 to command the terminal device 20 to transfer the sound data including the time information tc of the provisional segment in question. If the sound data (tc) of the segment identified by the time information tc included in the transfer command is present in the memory 22, the CPU 11 of the management device 10 reads out the sound data (tc) from the memory 22 and transmits the read-out sound data (tc) to the management device 10. If such sound data (tc) is not present in the memory 22, the terminal device 20 returns an error report to that effect. The CPU 11 of the management device 10 can convert the provisional segment (tc) of the track (p) into an actual segment (tc) on the basis of the sound data (tc) received from the terminal device 20. If the error report has been returned, or if no reply has been returned from the terminal device 20 within a predetermined time, the CPU 11 of the management device 10 makes an error display etc. on the display device 14.

The example illustrated in the lowermost portion of FIG. 11 shows a situation where tracks 1, 4, 5, and 6 are changed to RE=1 (recording valid) and tracks 2 and 3 are changed to RE=0 (recording invalid) at the time point of the aforementioned example illustrated in the middle portion of FIG. 11, starting of recording is instructed with the time cursor left at a preceding recording stop time point tc2, and then stopping of the recording is instructed when the time cursor has advanced to the time point tc2. At this time, provisional segments (provisional events 410*e*, 410*f*, 410*g*, and 410*h*) continuing from the time point tc2 to a time point tc3 are created in tracks 1, 4, 5, and 6.

In response to a reproduction start instruction given from the operator, the management device 10 reproduces sound data, recorded in the plurality of tracks 41, starting at the time point indicated by the time cursor and then outputs the sound data after mixing down the sound data to monaural or stereo sound data. The thus-output sound data are supplied, for example, to a powered speaker 30 (see FIG. 2) connected to the management device 10 and then sounded through the speaker 30. The plurality of tracks 41 of the current project have a common time axis designated by the time information tc, and the sound data reproduced in the plurality of tracks 41 constitute an ensemble performance (concert, ensemble, group singing, duet, trio, or the like) of a plurality of performance parts. For example, if the terminal devices 20 are assigned to individual ones of a plurality of players 120 of a brass band and if the conductor 110 operates the management device 10 to execute recording of a performance, a current project having player-specific tracks can be obtained in the management device. If the conductor 110 reproduces the current project via the management device 10 to sound the current project through the speaker 30, the conductor and the players can listen to performance sounds of the entire brass band. Further, by the conductor 110 setting a mute or solo mode of a desired one of the tracks 41 on the main screen 40, it is possible to reproduce the sound data of the tracks with only the desired track excluded, or reproduce only the sound data of the desired track. Namely, it is possible to reproduce performance sounds of only a particular performance part or performance parts of all of the performance pans other than the particular performance part.

Further, if the management device 10 is connected to the Internet 34 (see FIG. 2), the operator can cause the management device 10 to upload the recorded individual sound data and the project file to the cloud server 36 (see FIG. 2) on the Internet. Each of the terminal devices 20 can access the cloud server 36 to reproduce the sound data and the project file uploaded to the cloud server 36. Such reproduction is instructed, for example, by the user using the reproduction button 602 on the main screen 60 (FIG. 6). The reproduction of the project file includes reproducing the performance sounds of the entire brass bad, and performance sounds of only a particular performance part (or of all of the performance parts other than the particular performance part). At the time of the reproduction, the display style of the reproduction button 602 is changed to one indicating that reproduction is currently in progress. During the reproduction, the reproduction button 602 functions as a button for instructing stopping of the reproduction. Further, in reproducing the sound data on the terminal device 20, the user of the terminal device 20 can select a segment of the sound data to be reproduced by selecting a desired segment ID on the segment ID display section 604, adjust reproduced sound volume by use of the sound volume control bar 606, and the like. In addition, by use of the mute button 605, the user can mute the sound data corresponding to the terminal device 20 (performance part of the user); namely, the user can reproduce performance sounds with the performance part of the user excluded.

Further, the video camera 38 connected to the management device 10 may shoot an image in substantial synchronism with the recording executed in the management device 10. For example, in response to a recording start instruction from the operator, the management device 10 transmits to the video camera 38 a shooting start command and time information tc indicative of the time of the recording start command as a segment ID. The video camera 38 starts shooting in response to the shooting start command. Further, the management device 10 commands stopping of the shooting in response to a shooting stop instruction from the operator. The video camera 38 stops the shooting in response to the shooting stop command. The video camera 38 transmits the shot image to the management device 10 in association with the time information tc (segment ID). The management 10 stores the transmitted image into the memory 12 in association with the time information tc (segment ID), uploads the transmitted image to the cloud server 36, and the like. Thus, on the basis of the time information to (segment ID), segments of the image and the sound data can be associated with each other, for example, in such a manner that the sound data and the image can be reproduced in substantial synchronism with each other.

For example, the video camera 38 is used to shoot an image of the conductor 110. By synchronously reproducing the project file of the cloud server 36 and the image while muting the track performed by the user on the terminal device 20, the user can practice performing his or her own performance part in synchronism with performance sounds of the other players than the user while viewing motion of the conductor 110 through the image.

Figure 16:
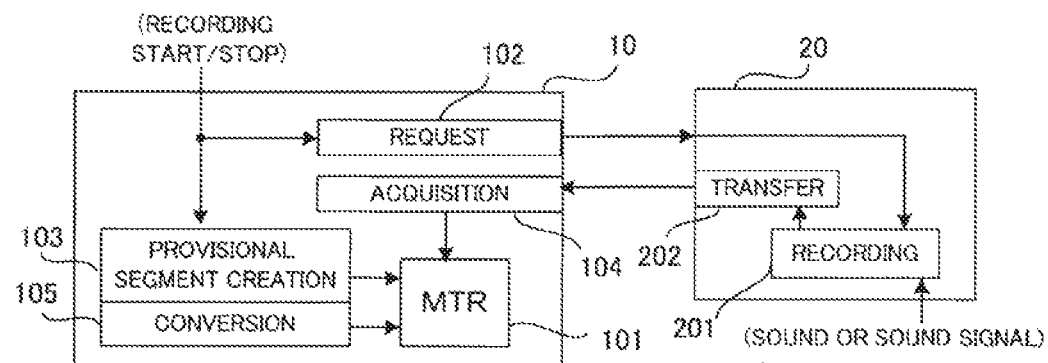
FIG. 16 is a block diagram explanatory of example constructions of a management device and terminal devices that constitute a recording system according to another embodiment of the present invention.

As another embodiment, the conventional DAW may be constructed to operate as the management device 10 of the present invention by adding functions to the conventional DAW. FIG. 16 shows example constructions of the management device 10 and the plurality of terminal devices 20 constituting a recording system according to the other embodiment. The same component elements as in FIG. 1 are denoted in FIG. 16 with the same reference numerals and characters and will not be described here. In the management device 10, the multi-track recording circuitry 101 includes tracks corresponding to the individual players p (i.e., player tracks) in addition to ordinary tracks of the DAW (i.e., native tracks). In response to a recording start/stop instruction given from the operator, a recording control circuitry 106 of the management device 10 not only causes the MTR 101 to start/stop recording of sound data supplied from the audio I/F 15 of the management device 10 into the native tracks but also causes the provisional segment creation circuitry 103 to perform its operation (step S22 of FIG. 12(*a*).) The native tracks and the player tracks (p) are displayed on the main screen 40 as the tracks 41 next to each other in an equal manner. Whereas events 410 and 415 of provisional and actual segments are displayed in the player tracks, only events 415 of actual segments are displayed in the native tracks. In the current project of the management device 10, tracks of sound data recorded by the management device 10 and tracks of sound data recorded by the individual terminal devices 20 are placed on a common time axis and can thus be reproduced synchronously.

Figure 17:
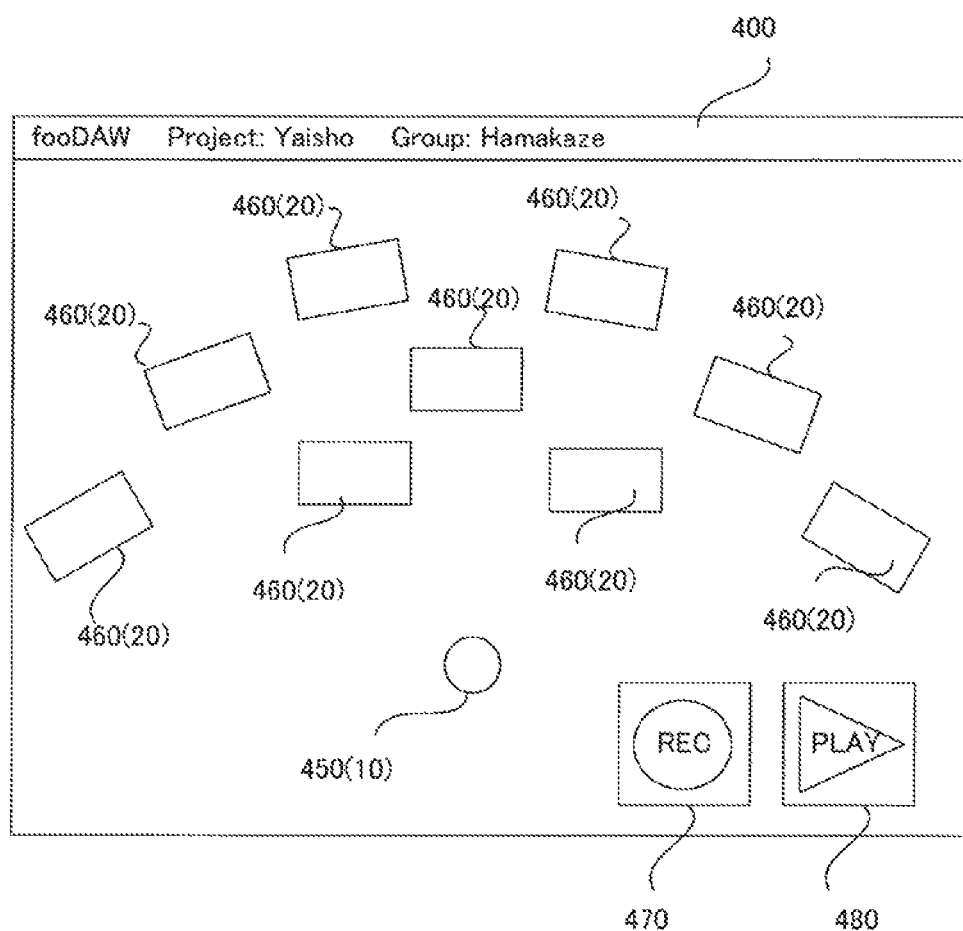
FIG. 17 is a diagram showing another example of a screen displayed on the management device to enable a recording valid/invalid switching operation etc.

The recording-system operating screen in the management device 10 is not necessarily limited to the main screen 40 of FIG. 4. FIG. 17 shows an example of another operating screen of the management device 10. On the screen 400 are displayed an image 450 indicative of the conductor (i.e., the management device) and images 460 indicative of terminals of a plurality of players (i.e., currently-online terminal devices 20). Once the conductor clicks any one of the terminal device images 460, the RE value for that terminal device 20 is switched between 1 and 0 (recording valid and invalid states) in a toggle-like manner. Also, the conductor can instruct start/stop of recording/reproduction by use of a recording button 470 and a reproduction button 480. In the illustrated example of FIG. 17, positions of the management device position 450 and the individual terminal device images 460 can be freely changed by the conductor while simulating players' positions in an orchestra, brass band or the like.

In the recording system according to the embodiment, as set forth above, the operator uses the recording button 45 of the management device 10 to cause the plurality of terminal devices 20 to simultaneously record sound data and then can allocate and record the sound data, recorded in the individual terminal devices 20, to tracks provided in the management device 10 in corresponding relation to the terminal devices 20. When a group music performance, such as a brass band performance or group singing, is to be recorded, for example, it is possible to readily record performance sounds of individual players and performance parts separately in corresponding ones of the tracks, namely, in separate tracks corresponding to the individual players and performance parts, if terminal devices 20 are provided for the individual players.

Further, in the recording system according to the embodiments, a personal-use device, such as a smartphone, can be used as-is or directly as the terminal device 20. Thus, the recording system can be built without using large-scale facilities etc. Further, each of the players 120 does not have to perform cumbersome setting work other than placing the terminal device 20 online with any one of the tracks of the management device 10 and near the player. Thus, the recording system according to the present invention can be introduced to an acoustic music performance environment, such as a brass band or a singing group, without requiring cumbersome equipment setting, wiring, etc.

Note that devices used as the management device 10 and the terminal devices 20 are not necessarily limited to computer devices and may be devices dedicated to the functions of the management device 10 and the terminal devices 20.

Although embodiments of the present invention have been described above in detail, it should be appreciated that the present invention is not necessarily limited to the above-described embodiments and may be modified variously within the scope of the technical ideal disclosed in the claims, description and drawings.

This application is based on, and claims priority to, JP PA 2016-042255 filed on 4 Mar. 2016 and International Patent Application No. PCT/JP2017/008000 filed on 28 Feb. 2017. The disclosure of the priority applications, in its entirety, including the drawings, claims, and the specification thereof, are incorporated herein by reference.

What is claimed is:

1. A recording system comprising:
a plurality of first devices each having a function for recording independently of other of the first devices; and
a second device having a plurality of tracks associated with the plurality of first devices;
the second device including:
provisional segment creation circuitry that, in response to a simultaneous recording command to the plurality of first devices, creates in each of the plurality of tracks a provisional segment identifying a time of the simultaneous recording;
acquisition circuitry that acquires from the plurality of first devices sound data simultaneously recorded in individual ones of the plurality of first devices in response to the simultaneous recording command; and
conversion circuitry that records the sound data, acquired from the individual first devices, into the provisional segments created in corresponding ones of the tracks and thereby converts the provisional segments into actual segments having the sound data actually recorded therein.

2. The recording system as claimed in claim 1, wherein the simultaneous recording command includes a recording start command for causing the plurality of first devices to start recording of the sound data, and a recording stop command for causing the first devices to stop the recording of the sound data, and wherein the provisional segment creation circuitry creates the provisional segment continuing from the recording start command to the recording stop command.

3. The recording system as claimed in claim 1, wherein the second device is further configured to inform, for each of the simultaneous recording commands, the plurality of first devices of identification information for identifying a recording responsive to the simultaneous recording command,
the provisional segment creation circuitry creates, for each of the simultaneous recording commands, the provisional segment in association with the identification information,
the acquisition circuitry further acquires, from the plurality of first devices, the identification information associated with the sound data recorded in response to the simultaneous recording command, and
the conversion circuitry associates the sound data and the provisional segment with each other based on the identification information associated with the acquired sound data and the identification information associated with the provisional segment.

4. The recording system as claimed in claim 3, wherein the identification information includes time information indicative of a start time of the recording responsive to the simultaneous recording command.

5. The recording system as claimed in claim 1, wherein each of the first devices includes recording circuitry that records sound data in response to the simultaneous recording command, and transfer circuitry that transfers the recorded sound data to the second device.

6. The recording system as claimed in claim 1, wherein the simultaneous recording command is a command to a portion of the plurality of first devices,
the portion of the plurality of first devices performs recording in response to the simultaneous recording command while other of the plurality of first devices does not perform recording in response to the simultaneous recording command, and
the provisional segment creation circuitry creates, in response to the simultaneous recording command, the provisional segment in the track corresponding to the portion of the plurality of first devices, but does not create, in response to the simultaneous recording command, the provisional segment in the track corresponding to the other of the first devices.

7. The recording system as claimed in claim 1, wherein the second device has, in addition to the plurality of tracks, a track associated with the second device.

8. The recording system as claimed in claim 1, wherein the second device uploads data of the plurality of tracks or the sound data acquired from the first devices to a cloud server connected to a communication network.

9. A recording method in a recording system that includes: a plurality of first devices each having a function for recording independently of other of the first devices; and a second device having a plurality of tracks associated with the plurality of first devices,
the recording method:
   a step of instructing the plurality of first devices to simultaneously record sound data;
   a creation step of, in response to the simultaneous recording instruction, causing the second device to create in each of the plurality of tracks a provisional segment identifying a time of the instructed recording;
   an acquisition step of causing the second device to acquire from the plurality of first devices sound data simultaneously recorded in individual ones of the plurality of first devices in response to the instruction; and
   a conversion step of causing the second device to record the sound data, acquired from the individual first devices, into the provisional segments created in corresponding ones of the tracks and thereby convert the provisional segments into actual segments having the sound data actually recorded therein.

10. The recording method as claimed in claim 9, wherein the simultaneous recording instruction includes a recording start instruction for causing the plurality of first devices to start recording of the sound data, and a recording stop instruction for causing the first devices to stop the recording of the sound data, and wherein the created provisional segment is a segment continuing from the recording start instruction to the recording stop instruction.

11. The recording method as claimed in claim 9, wherein each of the simultaneous recording instructions includes identification information for identifying a recording responsive to the instruction,
   the creation step creates, for each of the simultaneous recording instructions, the provisional segment in association with the identification information,
   the acquisition step acquires, from each of the plurality of first devices, not only the sound data but also the identification information associated with the sound data, and
   the conversion step associates the sound data and the provisional segment with each other based on the identification information of the acquired sound data and the identification information of the provisional segment.

12. A computer-readable non-transitory storage medium string a program executable by one or more processors for performing a recording method in a recording system that includes: a plurality of first devices each having a function for recording independently of other of the first devices; and a second device having a plurality of tracks associated with the plurality of first devices,
the recording method:
   a step of instructing the plurality of first devices to simultaneously record sound data;
   a creation step of, in response to the simultaneous recording instruction, causing the second device to create in each of the plurality of tracks a provisional segment identifying a time of the instructed recording;
   an acquisition step of causing the second device to acquire from the plurality of first devices sound data simultaneously recorded in individual ones of the plurality of first devices in response to the instruction; and
   a conversion step of causing the second device to record the sound data, acquired from the individual first devices, into the provisional segments created in corresponding ones of the tracks and thereby convert the provisional segments into actual segments having the sound data actually recorded therein.

13. The non-transitory storage medium as claimed in claim 12, wherein the simultaneous recording instruction includes a recording start instruction for causing the plurality of first devices to start recording of the sound data, and a recording stop instruction for causing the first devices to stop the recording of the sound data, and wherein the created provisional segment is a segment continuing from the recording start instruction to the recording stop instruction.

14. The non-transitory storage medium as claimed in claim 12, wherein each of the simultaneous recording instructions includes identification information for identifying a recording responsive to the instruction,
   the creation step creates, for each of the simultaneous recording instructions, the provisional segment in association with the identification information,
   the acquisition step further acquires, from each of the plurality of first devices, not only the sound data but also the identification information associated with the sound data, and
   the conversion step associates the sound data and the provisional segment with each other based on the identification information of the acquired sound data and the identification information of the provisional segment.

15. A recording system comprising:
a plurality of first devices each having a function for recording independently of other of the first devices; and
a second device having a plurality of tracks associated with the plurality of first devices;
the second device including a processor configured to:
   in response to a simultaneous recording command to the plurality of first devices, create in each of the plurality of tracks a provisional segment identifying a time of the simultaneous recording;
   in response to the simultaneous recording command, acquire from the plurality of first devices sound data simultaneously recorded in individual ones of the plurality of first devices; and
   record the sound data, acquired from the individual first devices, into the provisional segments created in corresponding ones of the tracks and thereby convert the provisional segments into actual segments having the sound data actually recorded therein.

* * * * *